May 1, 1956 P. A. FRANK 2,743,480
TIRE CURING PRESS
Filed June 5, 1951 4 Sheets-Sheet 1

INVENTOR.
PAUL A. FRANK
BY
Oberlin & Limbach
ATTORNEYS.

May 1, 1956 P. A. FRANK 2,743,480
TIRE CURING PRESS
Filed June 5, 1951 4 Sheets-Sheet 3

INVENTOR.
PAUL A. FRANK
BY
Oberlin + Limbach
ATTORNEYS.

United States Patent Office 2,743,480
Patented May 1, 1956

2,743,480

TIRE CURING PRESS

Paul A. Frank, Akron, Ohio

Application June 5, 1951, Serial No. 230,009

6 Claims. (Cl. 18—17)

The present invention relates generally as indicated to a tire curing press and has for its chief objects, the provision of a press of the character disclosed in my copending applications Serial Nos. 140,479 (now Patent 2,559,119, granted July 3, 1951) and 172,313 which is not only simple and foolproof in operation but which is additionally of construction such that the same may be readily adjusted to accommodate the user's preferences as to mold design and heating means therefor, and such that the components of the mold actuating mechanism, while subjected to severe loads, are nonetheless of relatively lightweight form owing to the manner of application of such loads thereon.

More specifically stated, one object of the present invention is the unique mounting of the tire-forming device for movement thereof to and from (a) a loading position whereat the space between the mold sections is unobstructed for facilitating removal of a cured and shaped tire from the press and loading of an uncured flat-built tire in the press and (b) an operating position whereat the forming device is telescoped in the uncured tire ready for shaping the latter upon radial expansion of the forming device and closing of the press.

Other objects are the provision of: fluid cushioning means operative to resiliently urge the ends of the forming device apart and thereby maintain the forming device in radially contracted condition during certain stages of its movement and to permit movement of the ends toward each other during the tire shaping operation; novel adjustable locking means associated with the forming device determining its operating position with respect to the selected mold and heating means design; novel adjusting means determining the maximum distance between the ends of the forming device; a unique arrangement for the circulation of curing medium through the forming device while isolating the curing medium from fluid pressure means actuating the forming device and resiliently urging the ends apart as aforesaid; and a novel press actuating linkage mechanism.

Other objects of the invention will become apparent as the description proceeds.

To the accomplishment of the foregoing and related ends, said invention then comprises the features hereinafter fully described and particularly pointed out in the claims, the following description and the annexed drawings setting forth in detail one illustrative embodiment of the invention, this being indicative, however, of but one of the various ways in which the principle of the invention may be employed.

Figure 1:
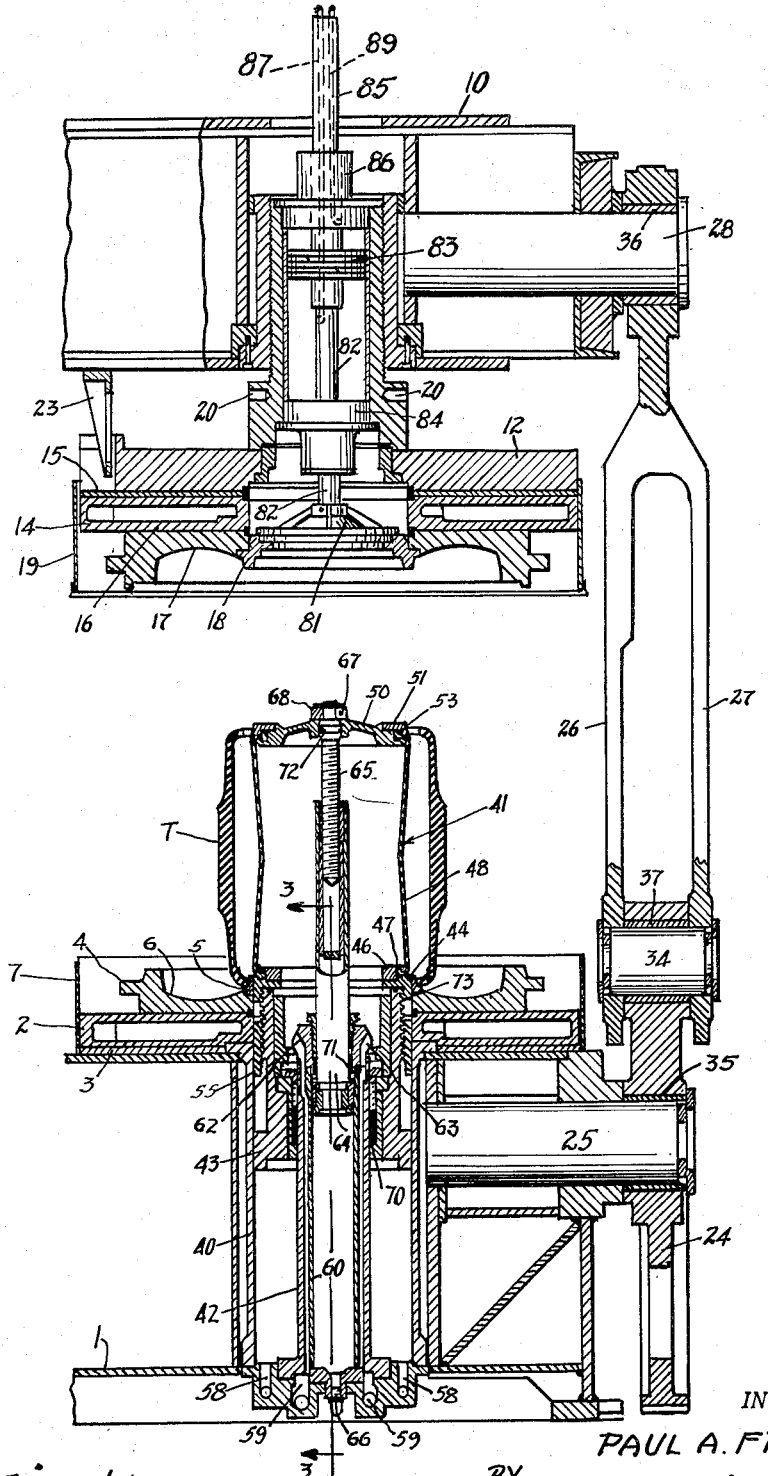
Fig. 1 is a vertical cross-sectional view centrally through the mold sections and tire-forming device, showing the press constituting the present invention in open and loaded position ready for closing.

Referring now more specifically to the drawing, the press comprises a base 1 forming a support for one or more steam heated platens 2 or equivalent mold heating means with insulating material 3 therebeneath. Each said platen 2 has mounted thereon a lower annular mold section 4 having a bead seat 5 on which the lower edge of an uncured tire T in pulley-band form is adapted to be seated and having a molding surface 6 corresponding to one side wall and a part of the tread portion of a finished tire. A heat shield 7 surrounds said platen 2 and mold section 4.

In the particular press herein illustrated there are two platens 2 and two lower mold sections 4 disposed side-by-side and therefore in order to simplify the description and to make possible a larger drawing the left-hand portion of the press including the left-hand platen and mold section have been omitted.

The rear portion of the base 1 is formed with a plurality of sockets 8 (herein two) receiving the lower ends of a corresponding number of posts 9 which vertically slidably support the upper press head 10. Said press head 10 extends forwardly from tubular guides 11 on each post and is provided with an adjustable head plate 12 screw threaded thereinto, the latter carrying a heated platen 14 with insulation 15 between said plate and said platen.

An upper annular mold section 16, having a molding surface 17 and a bead seat 18, is secured on the under side of platen 14, said molding surface 17 defining with molding surface 6 of mold section 4, when said mold sections are engaged, a complete tire cavity and said bead seat 18 being adapted to engage the upper edge of the uncured tire T. A heat shield 19 is secured to said plate 12 so as to surround platen 14 and upper mold section 17 and to overlap the top edge of shield 7 when the press is closed.

The screw thread adjustment of plate 12 in head 10 is effected as by a spanner wrench engageable in holes 20 to secure engagement of the mold sections 4 and 16 when the mold section 16 has been moved to its lowest position and locking of plate 12 in adjusted position is effected as by securing a bracket 23 to the under side of said head 10 so as to extend into a peripheral notch in plate 12 as best shown in Fig. 1. Vertical reciprocation of said press head 10 is effected by oscillation of bull gear cranks 24 180° in opposite directions on shafts 25 projecting from opposite sides of said base 1. Said cranks 24 each have pivotally secured thereto a forked link having legs 26—27 straddling the peripheral portion of said crank and extending upwardly and pivotally connected to a shaft 28 projecting from each side of said press head 10. Oscillation of said cranks 24 is effected by means of a reversible electric motor drive unit 29 operating through the gear train 30—31—32 of which the first gear 30 is the drive gear and the last gear 32 is in mesh with the crank 24.

Figure 2:
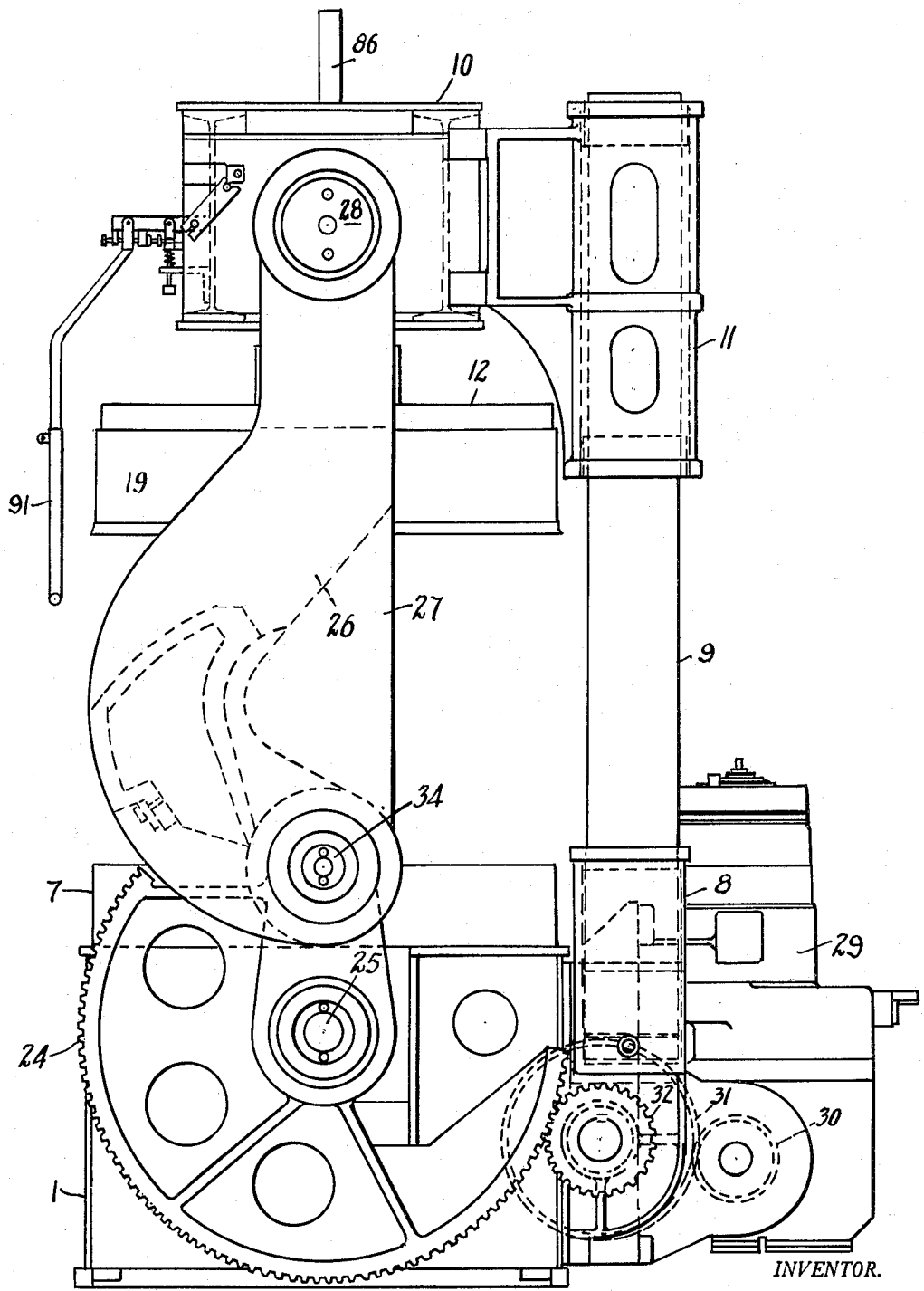
Fig. 2 is a side elevation view from the right-hand side of Fig. 1.

In order to reduce to a minimum the overhang between the forked link and the cranks 24 and to secure a double shear connection at pivot 34, the legs 26—27 straddle the crank and one leg 26 is of curved or bent form as shown so as to clear the shaft 25 when crank 24 is rotated 180° in a counterclockwise direction from the position shown in Fig. 2. Suitable bushings 35, 36 and 37 are disposed around the shafts 25 and 28 and pin 34.

Figure 4:
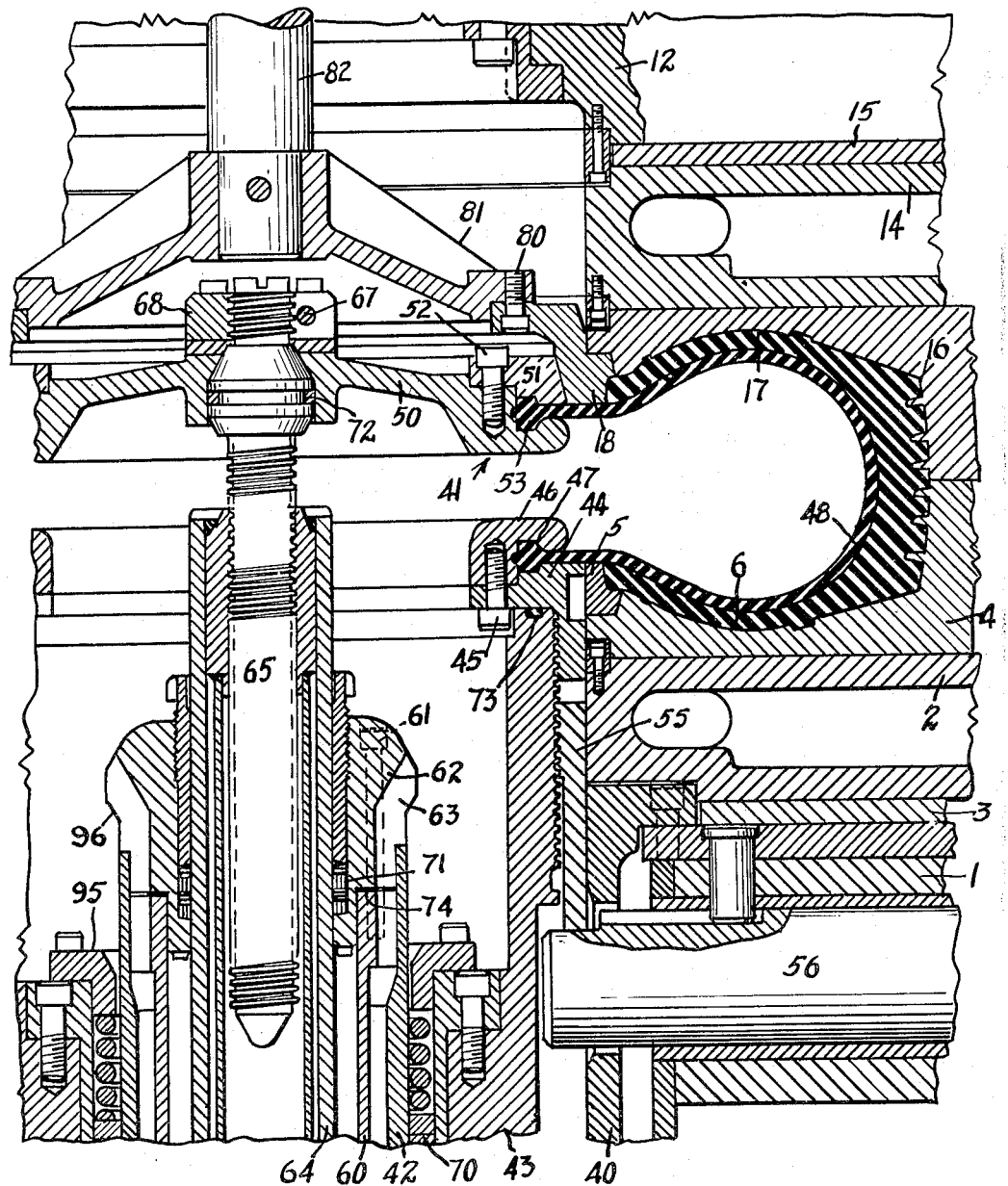
Fig. 4 is an enlarged fragmentary cross-sectional view similar to Fig. 3 except showing the press in closed position.

Coaxial with the lower mold section 4 is a cylindrical well or recess defined by the inner walls of said mold section 4, platen 2, and cylinder 40 fixed in base 1 and into and from which well a tire-forming device 41 is reciprocated between loading and operating positions. Centrally within cylinder 40 is another cylinder 42 which terminates below the top of the well as defined by the bead seat 5 of said lower mold section 4. An annular piston 43 is reciprocable in the space between cylinders 40 and 42, said piston 43 having a threaded upper end portion on which is threaded a collar 44 slidable along cylinder 40 and the inside walls of platen 2 and mold section 4. Secured to said collar 44 as by means of bolts 45 (see Fig. 4) is a ring 46, said ring 46 and said collar 44 being formed with opposed annular grooves clamping therebetween the lower beaded edge 47 of a generally cylindrical diaphragm 48. Said ring 46, collar 44, and piston 43 together constitute the lower head of the forming device 41.

The upper head of said forming device 41 comprises a disc member 50 and a ring 51 secured together as by bolts 52, and each being formed with opposed annular grooves to clamp therebetween the upper beaded edge 53 of said diaphragm 48.

Figure 3:
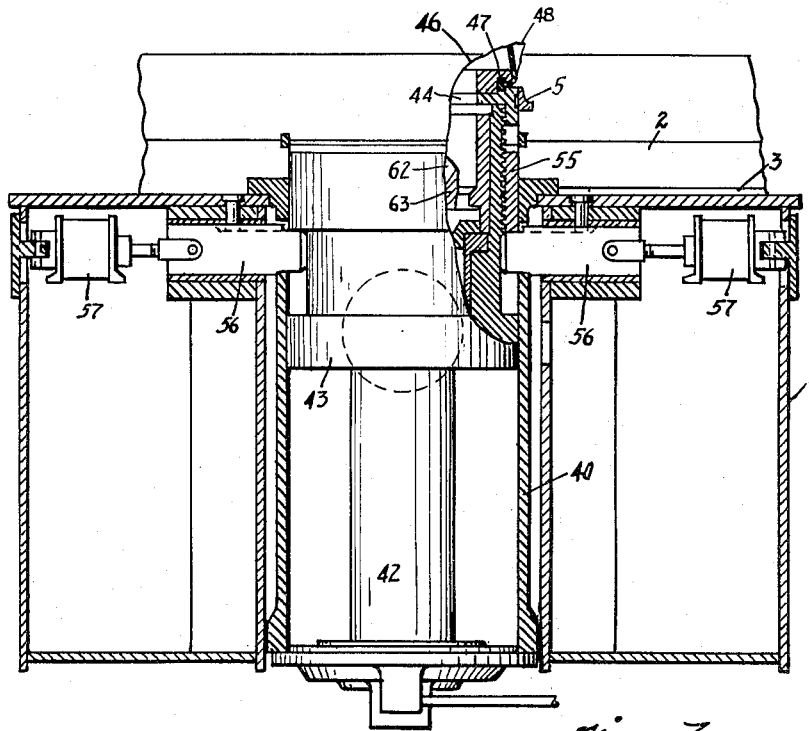
Fig. 3 is a fragmentary cross-sectional view taken substantially along the line 3—3, Fig. 1.

Said annular piston 43 has threaded thereonto a sleeve 55, the bottom edge of which is adapted to engage the top edges of locking plungers 56 (see Fig. 3) when the latter are actuated radially inwardly through the pneumatic cylinders 57 which are mounted on the front and rear walls of the base 1. Said sleeve 55 is adjustable to position the top surface of collar 44 flush with bead seat 5 in the operating position of said forming device, adjustment being effected by raising the forming device 41 to its upper limit and engaging a suitable wrench in the peripheral notches in the top edge of said sleeve 55. By providing this adjustment, different thicknesses of mold sections 4 may be accommodated or mold heating means other than platen 2 may be used.

Cylinder 40 has ports 58 at the bottom through which air or other fluid under pressure may enter to raise piston 43 to telescope said forming device 41 within an uncured tire T, and through which the fluid may be vented or connected with a vacuum source to lower said piston 43 to retract said forming device 41 into the well.

Cylinder 42 has therein another cylinder 60 spaced therefrom to form a passageway for steam, hot water or like curing medium entering through ports 59 and secured to the upper ends of cylinders 42 and 60 as by bolts 61 is a cylinder head 62 formed with a series of axially extending grooves 63 communicating with the aforesaid passageway and flaring outwardly as shown so as to direct the curing medium upwardly and outwardly toward the space between rings 46 and 50 in the closed position of the press.

A piston 64 is reciprocable in cylinder 60 and has threaded engagement with a rod 65 extending upwardly through the center of disc 50 of said forming device 41. A port 66 for air or other fluid is located at the lower end of cylinder 60, said port being adapted to be constantly in communication with a source of fluid under pressure so as to urge piston 64 upwardly and through rod 65 to resiliently urge the upper and lower heads of said forming device axially apart and thereby hold the diaphragm 48 in extended generally cylindrical radially contracted form. Adjustment of the maximum distance between said heads to preclude excessive stretching of the diaphragm 48 is effective by rotating rod 65 and locking the same in adjusted position by turning screw 67 which contracts the split nut 68 which is threaded on the upper end of said rod.

Suitable packing, packing rings, and gaskets 70, 71, 72, 73 and 74 are provided to prevent leakage of curing medium from within the forming device 41 and for preventing leakage of air or other fluid used in the actuation of pistons 43 and 64 into said forming device.

Bead seat 18 in this press is designed for movement downwardly with respect to upper mold section 16 for the purpose of stripping the cured tire T from said mold section onto a suitable tire removing device (not shown) which is adapted to be inserted beneath said supper mold section 16. Said seat member 18 is further formed with a tapered recess fitting a complementary tapered projection on the upper head ring 51 during the closing of the press. The downward movement of said seat member 18 for stripping the tire is obtained by bolting said member as by bolts 80 to a disc 81, said disc being pinned to the lower rod portion 82 of a piston 83, said rod portion extending through a cylinder head 84. Said piston 83 is reciprocable in the lined bore in the adjustable head plate assembly 12. An upper rod portion 85 extends upwardly through a cylinder head 86, said rod portion having a passageway 87 for fluid under pressure leading into said cylinder beneath piston 83 and another passageway 89 for venting the space above piston 83 whereby said piston may be held in its upper position holding the bead seat 18 in seated position. When it is desired to strip a tire from mold section 16, all that it is necessary to do is to communicate passage 89 with the pressure source and passage 87 with the vent, this being done as by means of a conventional four-way reversing valve.

The member 91 extending downwardly from press head 10 is part of a safety device to insure safe operation of the press, but because the present invention is not primarily concerned with this feature of the press detailed description of the safety device has been omitted.

Having thus described in detail the construction of a preferred embodiment of this invention reference will now be made to the operation thereof, it being understood that any known type of sequence control and timing device may be employed to effect operation of the several components of the press in desired sequence and for selected time periods, and therefore detail reference to such device is not required for the purposes of the instant disclosure.

At the beginning of the operation, the press is open as shown in Fig. 1 with the exception that the tire-forming device 41 is in retracted position within cylinder 40, the space beneath piston 43 being vented or communicated with a vacuum source if desired, and the space beneath piston 64 is in communication with a fluid pressure source so as to hold the forming-device heads apart and the diaphragm 48 in extended, radially contracted condition. The area of piston 64 and the pressure of the fluid acting thereon is not sufficient to bodily raise the forming device 41. With said forming device thus retracted in the well, the space between the mold sections 4 and 16 is unobstructed whereby the operator may apply a compound to the molding surface 6 of the lower mold section 4 to preclude sticking of the tire T therein after the cure and may position an uncured pulley-band tire T on the bead seat 5.

Next, fluid under pressure (preferably air) is admitted through ports 58 to act under piston 43 to bodily raise the forming device 41 to the operating position shown in Fig. 1 with diaphragm 48 telescoped within the uncured pulley-band tire T. During such movement of said forming device the fluid under pressure acting under piston 64 maintains the diaphragm heads in spaced relation with the diaphragm extended to generally cylindrical form. Upward movement of said forming device 41 is arrested by for example of the member 95 on said piston 43 with the shoulder 96 on member 62.

With the forming device 41 thus raised, fluid is admitted into the head ends of cylinders 57 to actuate the locking plungers 56 inwardly to a position underneath the bottom edge of sleeve 55 whereupon fluid pressure in cylinder 40 may be released or reduced to allow the forming device 41 to drop until sleeve 55 rests on the locking plungers 56. In this operating position of the forming device 41 the top surface of collar 44 is flush with the top surface of bead seat 5.

During the raising of said forming device 41 as aforesaid or thereafter, the drive unit 29 is energized to rotate the bull gear cranks 24 180° in a counterclockwise direction as viewed in Fig. 2 to thus cause the upper press head 10 to descend, thereby causing bead seat member 18 to engage the upper diaphragm head and the upper bead of the uncured tire T.

As such downward movement of mold section 16 occurs curing medium under pressure is admitted through a port 59 into the forming device 41 whereupon as the upper head of the forming device is moved downwardly, the diaphragm 48 will be radially expanded to correspondingly "belly" the uncured tire T thereabout until the latter assumes tire shape in engagement with the molding surfaces of the now closed mold sections 4 and 16.

After the mold closes, curing medium is still circulated through the forming device and also through the platens 2 and 14 to cure or vulcanize the tire to finished condition.

After the curing has been completed, cold water may be circulated through the forming device 41 to arrest the cure. Now, the drive unit 29 is again energized, this time to rotate the bull gear cranks 24 180° in the opposite direction whereupon the mold sections 4 and 16 are separated and if fluid pressure is maintained in the forming device, the same acting on disc 50 together with fluid pressure acting on piston 64 will hold the upper head of said forming device engaged with the bead seat member 18. Moreover because of the preferential treatment of the mold section 4 as aforesaid, the finished tire T will strip from said mold section 4. The weight of the lower head of said forming device is sufficient to hold the same against upward movement and if desired or necessary suction may be applied under piston 43 to assure against such upward movement of the lower diaphragm head.

With the forming device 41 vented, continued upward movement of mold section 16 and of the upper diaphragm head therewith under the influence of pressure exerted by piston 64, the diaphragm will be radially contracted out of the finished tire T which yet is stuck in the upper mold section 16.

Next, the cylinders 57 are actuated to withdraw plungers 56 from underneath sleeve 55 and thus to permit the forming device 41 to bodily descend into the well within cylinder 40 while piston 64 maintains the forming device in radially contracted form.

As a final operation, fluid under pressure will be admitted through passage 89 to urge piston 83 downwardly and thereby cause bead seat member 18 to strip the tire T from mold section 16. A suitable tire removing device may be positioned between the mold sections to catch the tire T thus stripped from the upper mold section and to remove the finished tire from the press.

After the finished tire T has been stripped from mold section 16, fluid under pressure will be admitted through passage 87 to restore seat member 18 to seated position. The operation of the press is then repeated for the next uncured tire T.

Other modes of applying the principle of the invention may be employed, change being made as regards the details described, provided the features stated in any of the following claims, or the equivalent of such, be employed.

I therefore particularly point out and distinctly claim as my invention:

1. Apparatus for forming flat-built tires into tire form and then vulcanizing the same into finished condition, comprising; a pair of opposed annular mold sections and supports therefor, means for relatively moving said mold sections between separated and closed positions, at least one of said mold sections having a central opening therethrough which forms with its support a well of which such opening is the mouth, a radially expansible and contractible tire-forming device disposed substantially in its entirety in such well, means acting on one end of said device to move the same while in radially contracted condition to a position projecting substantially in its entirety centrally from such well toward the other mold section and telescoping within an uncured tire in pulley-band form which is adapted to be positioned coaxially between said mold sections while said forming device is in such well, fluid pressure actuated means constantly and resiliently maintaining the opposite ends of said device spaced apart while said device is in such well and during movement of said device as aforesaid, said fluid pressure actuated means being effective, during relative movement of said mold sections to closed position and while the other mold section contacts the other end of said device, to yieldably oppose with substantially constant force relative movement of such ends of device toward each other, and latch means for predeterminedly positioning such one end of said device with respect to said one mold section in the projected position of said device.

2. Apparatus for forming flat-built tires into tire form and then vulcanizing the same into finished condition, comprising; a pair of opposed annular mold sections and supports therefor, means for relatively moving said mold sections between separated and closed positions, at least one of said mold sections having a central opening therethrough which forms with its support a well of which such opening is the mouth, a radially expansible and contractible tire-forming device disposed substantially in its entirety in such well, means acting on one end of said device to move the same while in radially contracted condition to a position projecting substantially in its entirety centrally from such well toward tthe other mold section and telescoping within an uncured tire in pulley-band form which is adapted to be positioned coaxially between said mold sections while said forming device is in such well, fluid pressure actuated means constantly and resiliently maintaining the opposite ends of said device spaced apart while said device is in such well and during movement of said device as aforesaid, said fluid pressure actuated means being effective, during relative movement of said mold sections to closed position and while the other mold section contacts the other end of said device, to yieldably oppose with substantially constant force relative movement of such ends of device toward each other, said means acting on such one end of said device comprising an annular piston, and concentric cylinders in which said annular piston is reciprocable, said fluid pressure actuated means comprising a piston which is secured to the other end of said device and which is reciprocable in the inner one of said concentric cylinders, and said inner one of said concentric cylinders terminating short of said one mold section to accommodate such other end of said device thereadjacent when said device is disposed in such well.

3. Apparatus for forming flat-built tires into tire form and then vulcanizing the same into fiunished condition, comprising; a pair of opposed annular mold sections and supports therefor, means for relatively moving said mold sections between separated and closed positions, at least one of said mold sections having a central opening therethrough which forms with its support a well of which such opening is the mouth, a radially expansible and contractible tire-forming device disposed substantially in its entirety in such well, means acting on one end of said device to move the same while in radially contracted condition to a position projecting substantially in its entirety centrally from such well toward the other mold section and telescoping within an uncured tire in pulley-band form which is adapted to be positioned coaxially between said mold sections while said forming device is in such well, fluid pressure actuated means constantly and resiliently maintaining the opposite ends of said device spaced apart while said device is in such well and during movement of said device as aforesaid, said fluid pressure actuated means being effective, during relative movement of said mold sections to closed position and while the other mold section contacts the other end of said device, to yieldably oppose with substantially constant force relative movement of such ends of device toward each other, said means acting on such one end of said device comprising an annular piston, and concentric cylinders in which said annular piston is reciprocable, said fluid pressure actuated means comprising a piston which is secured to the other end of said device and which is reciprocable in the inner one of said concentric cylinders, and said inner one of said concentric cylinders being formed with a passageway for fluid under pressure leading into the chamber defined between the ends of said device.

4. Apparatus for forming flat-built tires into tire form and then vulcanizing the same into finished condition, comprising; a pair of opposed annular mold sections and supports therefor, means for relatively moving said mold sections between separated and closed positions, at least one of said mold sections having a central opening therethrough which forms with its support a well of which such opening is the mouth, a radially expansible and contractible tire-forming device disposed substantially in its entirety in such well, means acting on one end of said device to move the same while in radially contracted condition to a position projecting substantially in its entirety centrally from such well toward the other mold section and telescoping within an uncured tire in pulley-band form which is adapted to be positioned coaxially between said mold sections while said forming device is in such well, fluid pressure actuated means constantly and resiliently maintaining the opposite ends of said device spaced apart while said device is in such well and during movement of said device as aforesaid, said fluid pressure actuated means being effective, during relative movement of said mold sections to closed position and while the other mold section contacts the other end of said device, to yieldably oppose with substantially constant force relative movement of such ends of device toward each other, said means acting on such one end of said device comprising an annular piston, and concentric cylinders in which said annular piston is reciprocable, the inner one of said concentric cylinders being provided with a radial projection engageable with said annular piston to arrest movement of said device to projected position.

5. Apparatus for forming flat-built tires into tire form and then vulcanizing the same into finished condition, comprising; a pair of opposed annular mold sections and supports therefor, means for relatively moving said mold sections between separated and closed positions, at least one of said mold sections having a central opening therethrough which forms with its support a well of which such opening is the mouth, a radially expansible and contractible tire-forming device disposed substantially in its entirety in such well, means acting on one end of said device to move the same while in radially contracted condition to a position projecting substantially in its entirety centrally from such well toward the other mold section and telescoping within an uncured tire in pulley-band form which is adapted to be positioned coaxially between said mold sections while said forming device is in such well, fluid pressure actuated means constantly and resiliently maintaining the opposite ends of said device spaced apart while said device is in such well and during movement of said device as aforesaid, said fluid pressure actuated means being effective, during relative movement of said mold sections to closed position and while the other mold section contacts the other end of said device, to yieldably oppose with substantially constant force relative movement of such ends of device toward each other, said means acting on such one end of said device comprising an annular piston, and concentric cylinders in which said annular piston is reciprocable, said fluid pressure actuated means comprising a piston which is secured to the other end of said device and which is reciprocable in the inner one of said concentric cylinders, and said inner one of said concentric cylinders and the piston reciprocable therein having interengageable shoulders which engage when said device is in the position projecting from one mold section toward the other, said piston being adjustable in length to enable desired adjustment of the distance between the ends of said device.

6. In a tire curing press, a pair of opposed annular mold sections and means for relatively moving the same from an axially separated position to a closed, mating position whereat they define a cavity of tire shape therebetween, a bead engaging member on each mold section adapted, during relative movement of said mold sections to be closed, mating position, to engage and urge toward each other the beads of a pulley band tire positioned between the separated mold sections, one of said members being carried by one mold section for movement toward and away from the other member independently of the relative movement of said mold sections, means for so independently moving said one member, a radially expansible tire forming device mounted for reciprocatory movement from a position within the other mold section to a position projecting therefrom toward said one mold section and telescoped within a pulley band tire with its projecting end adapted for engagement by said independently movable member, and means for so reciprocating said device to such projecting relation from said other mold section and to the retracted position within said other mold section.

References Cited in the file of this patent

UNITED STATES PATENTS

| | | |
|---|---|---|
| 1,174,885 | Macbeth | Mar. 7, 1916 |
| 1,977,119 | De Mattia | Oct. 16, 1934 |
| 2,224,336 | Bostwick | Dec. 10, 1940 |
| 2,243,532 | Maynard | May 27, 1941 |
| 2,255,646 | Brewer et al. | Sept. 9, 1941 |
| 2,296,800 | Soderquist | Sept. 22, 1942 |
| 2,355,846 | Brundage | Aug. 15, 1944 |
| 2,495,663 | Soderquist | Jan. 24, 1950 |
| 2,495,664 | Soderquist | Jan. 24, 1950 |
| 2,559,119 | Frank | July 3, 1951 |